(12) United States Patent
Ehrmaier et al.

(10) Patent No.: US 6,260,432 B1
(45) Date of Patent: Jul. 17, 2001

(54) SELECTING DEVICE FOR AN AUTOMATIC TRANSMISSION OF A MOTOR VEHICLE

(75) Inventors: Rudolf Ehrmaier, Munich; Josef Neuner, Raubling, both of (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/417,120

(22) Filed: Oct. 13, 1999

(30) Foreign Application Priority Data

Nov. 3, 1998 (DE) .............................................. 198 50 685

(51) Int. Cl.⁷ ............................ F16H 59/02; B60K 26/00
(52) U.S. Cl. .................................. 74/473.18; 74/473.19; 74/484 R; 180/333; 180/336
(58) Field of Search ........................... 74/473.18, 473.19, 74/484 R; 180/333, 336

(56) References Cited

U.S. PATENT DOCUMENTS

| | | | |
|---|---|---|---|
| 5,315,515 | * 5/1994 | Schmitz ..................................... 701/2 |
| 5,335,743 | * 8/1994 | Gillbrand et al. ................ 180/333 X |
| 5,938,282 | * 8/1999 | Epple ................. 180/333 X |

FOREIGN PATENT DOCUMENTS

| | | |
|---|---|---|
| 3924318A1 | 1/1991 | (DE) . |
| 3925064A1 | 1/1991 | (DE) . |
| 547598 | * 6/1993 | (EP) .................................. 74/335 X |

* cited by examiner

Primary Examiner—Allan D. Herrmann
(74) Attorney, Agent, or Firm—Crowell & Moring, L.L.P.

(57) ABSTRACT

A selecting device facilitates selecting operating positions of an automatic transmission of a motor vehicle by the deflection of a selector lever which moves back automatically from all deflecting directions for selecting the individual operating positions. The automatic transmission can be controlled by this selector lever in a first operating mode—selecting individual driving positions in the automatic operation—or, in a second operating mode—step-by-step shifting of the gears in the manual operation. For each operating mode, one operating position of the automatic transmission respectively is assigned to each deflecting direction of the selector lever. The selector lever is movable, in two shifting channels which are essentially disposed perpendicularly with respect to one another such that maximally four operating positions can be selected in each of the two operating modes. In a third operating mode, cruise control functions can be controlled by means of the selector lever.

39 Claims, 1 Drawing Sheet

SELECTING DEVICE FOR AN AUTOMATIC TRANSMISSION OF A MOTOR VEHICLE

BACKGROUND AND SUMMARY OF THE INVENTION

This application claims the priority of German application 198 50 685, filed in Germany on Nov. 3, 1998, the disclosure of which is expressly incorporated by reference herein.

The invention relates to a selecting device for an automatic transmission of a motor vehicle. Preferred embodiments of the invention relate to a selecting device for selecting operating positions of an automatic transmission of a motor vehicle by deflecting a selector lever, which selector lever automatically moves back from all deflecting directions for selecting the individual operating positions and by means of which the automatic transmission can be controlled in a first operating mode—selection of individual driving positions in the automatic operation—or in a second operating mode—step-by-step shifting of the gears in the manual operation—by means of a transmission control device, for each operating mode, one operating position respectively of the automatic transmission being assigned to each deflection direction of the selector lever.

It is known to design an automatically shifted motor vehicle transmission and its selecting device such that, by means of the selecting device, the driver can choose between a step-by-step shifting operation and an automatic driving position operation.

In the case of the automatic driving position operation, the operating range of the automatically shifted motor vehicle transmission is divided into different, manually preselectable operating steps which are called driving positions and which represent the different vehicle operating conditions. The term "driving positions", as it is used here, comprises all operating steps of an automatically shifted motor vehicle transmission, thus also the parking position and the neutral position.

In the step-by-step shifting operation, the automatically shifted motor vehicle transmission is shifted manually by the driver. By swivelling the selector lever out of a center position, he can, in each case, shift up or down by one gear, depending on the direction into which he moves the selector lever. After each shifting operation, the selector lever moves back into its center position.

German Patent Document DE 39 29 268 A1 describes a selecting device with one operating plane in the longitudinal direction of the vehicle and one operating plane perpendicular thereto, in the case of which the selector lever automatically moves back from some operating directions into its starting position.

Since here only the control unit of the automatically shifted motor vehicle transmission is controlled by way of the selector lever, another operating element is required for controlling cruise control functions.

It is therefore an object of the invention to develop a selecting device for an automatically shifted motor vehicle transmission such that no operating element for controlling cruise control functions is required.

According to the invention, this object is achieved by providing a selecting device of the above-noted type wherein maximally four operating positions can be selected in each of the first and second operating modes by movement of the selector lever in two shifting channels which are essentially disposed perpendicularly with respect to one another, and wherein cruise control functions can be controlled by means of the selector lever in a third operating mode.

Further features and advantages of preferred embodiments of the invention are described in the specification and the claims.

According to the invention, in the case of a selecting device for selecting operating positions of an automatic transmission of a motor vehicle by the deflection of a selector lever, which automatically moves back from all deflecting directions for selecting the individual operating positions and by means of which the automatic transmission can be controlled in a first operating mode—selection of individual driving positions in the automatic operation—or in a second operating mode—step-by-step shifting of the gears in the manual operation—by means of a transmission control device, for each operating mode, one operating position respectively of the automatic transmission being assigned to each deflection direction of the selector lever, cruise control functions are controlled in that, by means of the selector lever, in two shifting channels, which are essentially disposed perpendicularly to one another, maximally four operating positions can be selected in each of the two operating modes and in that a third operating mode exists in which cruise control functions can be controlled by means of the selector lever.

Since an operating element for controlling cruise control functions is not required in preferred embodiments of the invention, advantages are obtained with respect to the assembly, the saving of costs and the weight.

In a preferred embodiment of the invention, it is provided that the selecting device has a change-over device, which is separate from the selector lever, for changing between the operating modes. This has the advantage that the individual operating modes can be selected in a simple manner.

If the selector lever is constructed as a steering column assembly lever, the driver's hand can advantageously remain at the steering wheel for operating the selecting device; likewise, if the selector lever is mounted directly on the steering wheel.

In another preferred embodiment of the invention, it is provided that a change-over device is constructed at the steering wheel, particularly by means of push buttons, which is separate from the selector lever. For operating the change-over device, the driver's hand can therefore also remain at the steering wheel.

In the case of an advantageous embodiment of the invention, it is provided that a movement of the selector lever directed essentially away from a driver in the first operating mode—stopped vehicle—causes the engaging of the driving position D of the automatic transmission, and in the case of a forward-driving vehicle, a holding of a constant speed, and in the second operating mode, a sequential upshifting of the automatic transmission, and in the third operating mode, acceleration during the drive.

In the case of another advantageous embodiment of the invention, it is provided that a movement of the selector lever directed essentially toward a driver in the first operating mode, when the vehicle is stopped, causes the engagement of the driving position R of the automatic transmission, and in the second operating mode, a sequential backshifting of the automatic transmission, and in the third operating mode, a reduction of the current speed to a stoppage.

Furthermore, it is advantageous according to certain preferred embodiments that a movement of the selector lever which is essentially directed transversely to a driver, toward the driver or upwards in the first operating mode causes an engagement of the driving position P of the automatic transmission and, in the third operating mode, a canceling of the current adjustments.

Likewise, it is advantageous according to certain preferred embodiments that a movement of the selector lever essentially transversely to a driver, away from the driver or downwards in the first operating mode causes an engagement of the driving position N of the automatic transmission and, in the third operating mode, a canceling of the current adjustments.

A combination of these selector lever functions advantageously causes on the whole an ergonomically favorable arrangement of all individual selectable operating positions of the automatically shifted transmission and of the cruise control functions.

In certain preferred embodiments of the invention, it is provided that a selecting device is constructed such that, at a driving speed of the motor vehicle below a certain rate, the transmission control device switches over automatically from the possibly selected third operating mode into the first operating mode. If the rate of the driving speed, below which an automatic change-over takes place, is, for example, at 20 km/h, this has the advantage that the driver, in speed ranges in which cruise control functions are rarely required, must not actively shift out of these.

Other objects, advantages and novel features of the present invention will become apparent from the following detailed description of the invention when considered in conjunction with the accompanying drawings.

DETAILED DESCRIPTION OF THE INVENTION

Figure 1:
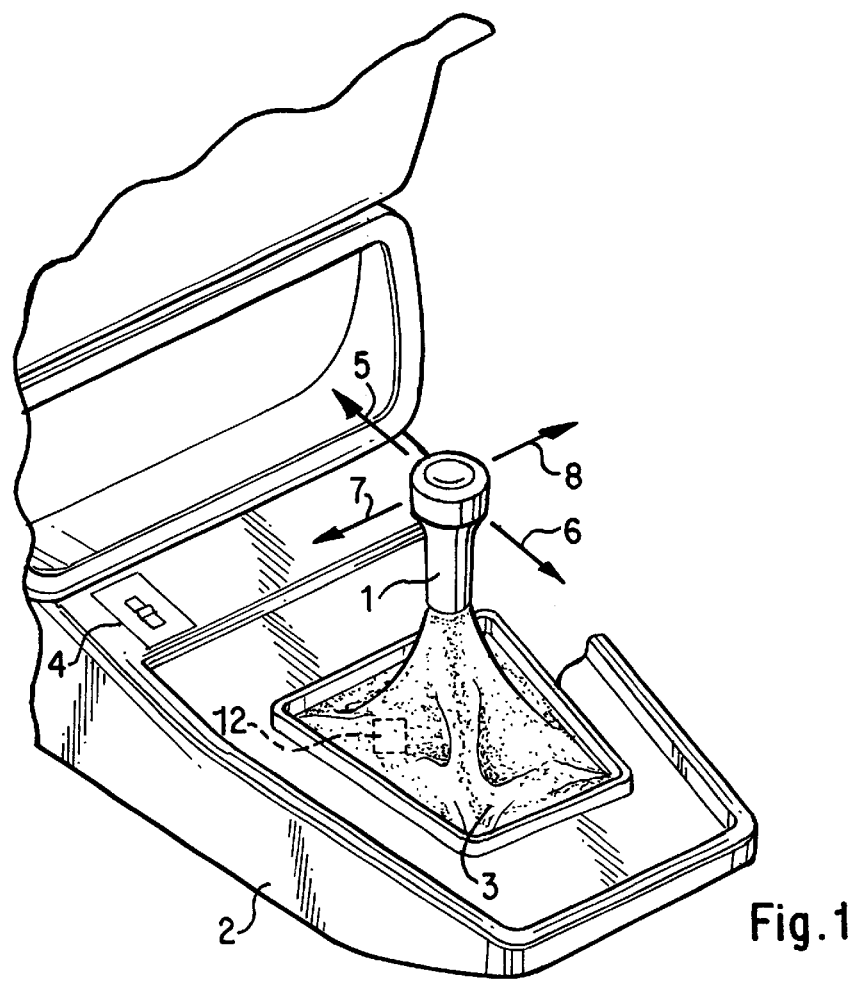
FIG. 1 is a schematic view of a selector lever, which automatically moves back into its starting position, on the center console of a motor vehicle,, having two operating planes which are situated perpendicularly with respect to one another.

According to FIG. 1, a selector lever 1 is disposed on a center console 2 of a motor vehicle which is not shown in detail. The selector lever 1 is used as a selecting device for engaging individual operating positions of a motor vehicle transmission, which is also not shown, and has, for this purpose, electric contacts at its lower end which cannot be viewed through a collar 3. By closing the contacts when the selector lever 1 is operated, switching commands are supplied to an analyzing circuit. The analyzing circuit is not an object of the invention and is therefore not shown and not explained in detail. It should only be mentioned that it can easily be built by a person skilled in the art and preferably contains a microcomputer. It has the task of, among other things, controlling actuators for the motor vehicle transmission.

The selector lever 1 can be displaced in two operating planes disposed perpendicularly with respect to one another. Four directions are obtained in this case which are marked in FIG. 1 by corresponding arrows. Each of the four arrows 5, 6, 7, 8 shows one moving possibility respectively for the selector lever 1, for selecting a new operating position of an automatic transmission in each case for the operating modes of automatic driving position operation, of step-by-step shifting operation and for controlling cruise control functions. The change-over between the operating modes of step-by-step shifting operation and automatic driving position operation and for controlling the cruise control functions by way of the selector lever 1 takes place on a change-over device 4 which is mounted on the center console 2 separately from the selector lever 1. The change-over device 4 consists of three push switches for selecting in each case one of the three operating modes for the selector lever 1.

In the first operating mode—selecting individual driving positions in the automatic operation—the different operating positions of the automatic transmission, corresponding to the deflecting directions of the selector lever 1, in the longitudinal direction of the vehicle are illustrated by the arrows 5 and 6. If the selector lever 1 is deflected in the direction of the arrow 5, the driving position D for the forward driving operation is engaged; in the case of the movement of the selector lever 1 in the direction of arrow 6, the driving position R for the reverse driving operation is engaged. Perpendicularly thereto, the selector lever 1 can be deflected in the direction of the arrow 7, whereby the driving position P—the parking position—is engaged. If the selector lever 1 is moved in the direction of the arrow 8, the driving position N—neutral—is engaged; this means that the vehicle is stopped since the power flux in the transmission line is interrupted.

After its deflection, the selector lever 1 always automatically returns into the illustrated operating position by way of a return mechanism, shown schematically at 12 in FIG. 1, for selecting individual driving positions in the automatic operation. From this automatic driving position operating mode, a change-over can take place into a second operating mode—step-by-step shifting operation—by operating the push button of the change-over device 4 provided for this purpose.

In this second operating mode for the step-by-step shifting of the gears in the manual operation, the individual gears can be upshifted sequentially by moving the selector lever 1 in the direction of the arrow 5 and can be downshifted by moving it in the direction of the arrow 6. In this case, the selector lever 1 also always moves back automatically into the illustrated operating position by way of return mechanism 12 for the step-by-step shifting operation. A swivelling of the selector lever 1 in the direction of the arrow 5 engages in this operating mode step-by-step shifting operation the next higher gear in the motor vehicle transmission. For a further manual upshifting, the selector lever 1 is swivelled in the same manner in the same direction. When the selector lever 1 is swivelled in the direction of the arrow 6, a step-by-step backshifting takes place.

A third operating mode, into which the selector lever 1 can be changed by operating the push button of the change-over device 4 provided for this purpose, is used for controlling cruise control functions by the selector lever 1. In this case, a movement of the selector lever 1, which is essentially directed away from the driver, in the direction of the arrow 5, causes an acceleration of the motor vehicle during the drive. A movement of the selector lever 1, in the direction of the arrow 6, directed essentially toward the driver, in contrast, reduces the current speed successively to a stoppage. A movement of the selector lever 1, in the direction of the arrow 7, directed essentially transversely toward the driver causes the canceling of the current adjustments, and movement in the opposite direction,, in the direction of the arrow 8, directed essentially transversely to the driver away from the latter, also causes the canceling of the current adjustments.

Figure 2:
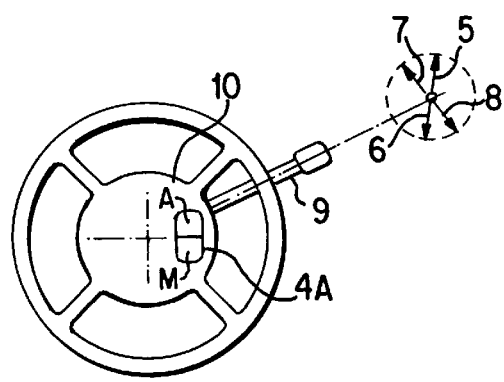
FIG. 2 is a schematic view of a selector lever of a motor vehicle which automatically moves back into its starting position and is constructed as a steering column assembly switch, having two operating planes which are disposed perpendicularly with respect to one another.

FIG. 2 illustrates a selecting device corresponding to that of FIG. 1, but in this case the selector lever is constructed as a steering column assembly lever 9. Corresponding to the description of FIG. 1, the four arrows 5, 6, 7, 8 show the same moving possibilities for the steering column assembly lever 9 for selecting new operating positions of the automatic transmission for the same operating modes, automatic driving position operation and step-by-step shifting operation and the control of the cruise control functions. However, in the case of this arrangement, the transverse movement of the selector lever 1 from FIG. 1 in the direction of the arrows 7, 8 becomes a movement of lever 9 which is essentially directed upwards, arrow 7, FIG. 2, and is essentially directed downwards, arrow 8, FIG. 2. Here, the change-over between the operating modes of step-by-step shifting operation and automatic driving position operation takes place at the change-over device 4A which is mounted on a steering wheel 10 separately from the steering column assembly lever 9. The change-over device 4A includes two push switches for selecting the first or the second operating mode respectively for the automatic transmission.

Figure 3:
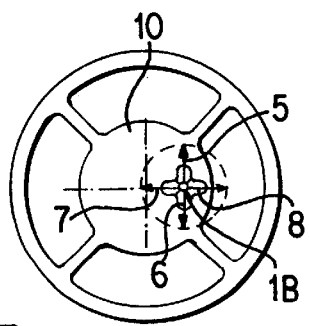
FIG. 3 is a schematic view of a selector lever, which automatically moves back into its starting position, on the steering wheel of a motor vehicle, having two operating planes which are disposed perpendicularly with respect to one another.

FIG. 3 shows another selecting device corresponding to that of FIG. 1. However, there the selector lever 1B is constructed directly on the steering wheel 10. Corresponding to the description of FIG. 1, the four arrows 5, 6, 7, 8 also show the same selecting possibilities of new operating positions of the automatic transmission by the selector lever 1B, for the same operating modes of automatic driving position operation and step-by-step shifting operation and, in addition, the control of the cruise control functions. The change-over between the operating modes takes place here on a change-over device, shown schematically at 4B, which is also separate from the selector lever 1B.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof .

What is claimed is:

1. Selecting device for selecting operating positions of an automatic transmission of a motor vehicle by deflection of a selector lever into a plurality of deflecting directions comprising:

a selector lever which automatically moves back from the deflecting directions for selecting an individual operating position and by which the automatic transmission is controlled in a first or a second operating mode;

the first operating mode including a selection of individual driving positions in an automatic operation and the second operating mode including a step-by-step shifting of gears in a manual operation by way of a transmission control device;

wherein for each operating mode, each individual operating position of the automatic transmission is assigned to a respective deflection direction of the selector lever;

wherein maximally four operating positions are selectable in each of the first and second operating modes by movement of the selector lever in two shifting channels which are disposed substantially perpendicularly with respect to one another;

wherein cruise control functions are controlled by way of the selector lever in a third operating mode.

2. Selecting device according to claim 1, wherein a change-over device, which is separate from the selector lever, is provided for changing between the operating modes.

3. Selecting device according to claim 1, wherein the selector lever is constructed as a steering column assembly lever.

4. Selecting device according to claim 2, wherein the selector lever is constructed as a steering column assembly lever.

5. Selecting device according to claim 2, wherein the change-over device is disposed on the steering wheel as push buttons.

6. Selecting device according to claim 4, wherein a change-over device is disposed on the steering wheel as push buttons.

7. Selecting device according to claim 1, wherein a movement of the selector lever directed substantially away from the driver, in the first operating mode, when the vehicle is stopped, causes an engagement of a driving position D of the automatic transmission, and in the case of a forward-driving vehicle, a holding of a constant speed, and in the second operating mode, a sequential upshifting of the automatic transmission, and in the third operating mode, an acceleration during the drive.

8. Selecting device according to claim 2, wherein a movement of the selector lever directed substantially away from the driver, in the first operating mode, when the vehicle is stopped, causes an engagement of a driving position D of the automatic transmission, and in the case of a forward-driving vehicle, a holding of a constant speed, and in the second operating mode, a sequential upshifting of the automatic transmission, and in the third operating mode, an acceleration during the drive.

9. Selecting device according to claim 3, wherein a movement of the selector lever directed substantially away from the driver, in the first operating mode, when the vehicle is stopped, causes an engagement of a driving position D of the automatic transmission, and in the case of a forward-driving vehicle, a holding of a constant speed, and in the second operating mode, a sequential upshifting of the automatic transmission, and in the third operating mode, an acceleration during the drive.

10. Selecting device according to claim 6, wherein a movement of the selector lever directed substantially away from the driver, in the first operating mode, when the vehicle is stopped, causes an engagement of a driving position D of the automatic transmission, and in the case of a forward-driving vehicle, a holding of a constant speed, and in the second operating mode, a sequential upshifting of the automatic transmission, and in the third operating mode, an acceleration during the drive.

11. Selecting device according to claim 1, wherein a movement of the selector lever directed substantially toward a driver in the first operating mode, when the vehicle is stopped, causes an engagement of a driving position R of the automatic transmission, and in the second operating mode, a sequential backshifting of the automatic transmission, and in the third operating mode, a reduction of a current speed to a stoppage.

12. Selecting device according to claim 2, wherein a movement of the selector lever directed substantially toward a driver in the first operating mode, when the vehicle is stopped, causes an engagement of a driving position R of the automatic transmission, and in the second operating mode, a sequential backshifting of the automatic transmission, and in the third operating mode, a reduction of a current speed to a stoppage.

13. Selecting device according to claim 3, wherein a movement of the selector lever directed substantially toward a driver in the first operating mode, when the vehicle is stopped, causes an engagement of a driving position R of the automatic transmission, and in the second operating mode, a sequential backshifting of the automatic transmission, and in the third operating mode, a reduction of a current speed to a stoppage.

14. Selecting device according to claim 6, wherein a movement of the selector lever directed substantially toward a driver in the first operating mode, when the vehicle is stopped, causes an engagement of a driving position R of the automatic transmission, and in the second operating mode, a sequential backshifting of the automatic transmission, and in the third operating mode, a reduction of a current speed to a stoppage.

15. Selecting device according to claim 7, wherein a movement of the selector lever directed substantially toward a driver in the first operating mode, when the vehicle is stopped, causes an engagement of a driving position R of the automatic transmission, and in the second operating mode, a sequential backshifting of the automatic transmission, and in the third operating mode, a reduction of a current speed to a stoppage.

16. Selecting device according to claim 1, wherein a movement of the selector lever directed substantially transversely to a driver and toward the driver, in the first operating mode, causes an engagement of a driving position P of the automatic transmission, and, in the third operating mode, causes a canceling of current adjustments.

17. Selecting device according to claim 2, wherein a movement of the selector lever directed substantially transversely to a driver and toward the driver, in the first operating mode, causes an engagement of a driving position P of the automatic transmission, and, in the third operating mode, causes a canceling of current adjustments.

18. Selecting device according to claim 3, wherein a movement of the selector lever directed substantially transversely to a driver and toward the driver, in the first operating mode, causes an engagement of a driving position P of the automatic transmission, and, in the third operating mode, causes a canceling of current adjustments.

19. Selecting device according to claim 7, wherein a movement of the selector lever directed substantially transversely to a driver and toward the driver, in the first operating mode, causes an engagement of a driving position P of the automatic transmission, and, in the third operating mode, causes a canceling of current adjustments.

20. Selecting device according to claim 15, wherein a movement of the selector lever directed substantially transversely to a driver and toward the driver, in the first operating mode, causes an engagement of a driving position P of the automatic transmission, and, in the third operating mode, causes a canceling of current adjustments.

21. Selecting device according to claim 1, wherein a movement of the selector lever directed substantially transversely to a driver and away from the driver, in the first operating mode, causes an engagement of a driving position N of the automatic transmission, and, in the second operating mode, causes a canceling of current adjustments.

22. Selecting device according to claim 2, wherein a movement of the selector lever directed substantially transversely to a driver and away from the driver, in the first operating mode, causes an engagement of a driving position N of the automatic transmission, and, in the second operating mode, causes a canceling of current adjustments.

23. Selecting device according to claim 3, wherein a movement of the selector lever directed substantially transversely to a driver and away from the driver, in the first operating mode, causes an engagement of a driving position N of the automatic transmission, and, in the second operating mode, causes a canceling of current adjustments.

24. Selecting device according to claim 7, wherein a movement of the selector lever directed substantially transversely to a driver and away from the driver, in the first operating mode, causes an engagement of a driving position N of the automatic transmission, and, in the second operating mode, causes a canceling of current adjustments.

25. Selecting device according to claim 15, wherein a movement of the selector lever directed substantially transversely to a driver and away from the driver, in the first operating mode, causes an engagement of a driving position N of the automatic transmission, and, in the second operating mode, causes a canceling of current adjustments.

26. Selecting device according to claim 20, wherein a movement of the selector lever directed substantially transversely to a driver and away from the driver, in the first operating mode, causes an engagement of driving position N of the automatic transmission, and, in the second operating mode, causes a canceling of current adjustments.

27. Selecting device according to claim 1, wherein, at a driving speed of the motor vehicle below a certain rate, the transmission control device changes automatically from the third operating mode into the first operating mode when in the third operating mode.

28. Selecting device according to claim 2, wherein, at a driving speed of the motor vehicle below a certain rate, the transmission control device changes automatically from the third operating mode into the first operating mode when in the third operating mode.

29. Selecting device according to claim 7, wherein, at a driving speed of the motor vehicle below a certain rate, the transmission control device changes automatically from the third operating mode into the first operating mode when in the third operating mode.

30. Selecting device according to claim 15, wherein, at a driving speed of the motor vehicle below a certain rate, the transmission control device changes automatically from the third operating mode into the first operating mode when in the third operating mode.

31. Selecting device according to claim 20, wherein, at a driving speed of the motor vehicle below a certain rate, the transmission control device changes automatically from the third operating mode into the first operating mode when in the third operating mode.

32. Selecting device according to claim 26, wherein, at a driving speed of the motor vehicle below a certain rate, the transmission control device changes automatically from the third operating mode into the first operating mode when in the third operating mode.

33. Selector assembly for selecting operating positions of a motor vehicle automatic transmission, comprising:
  a manually engageable selector lever,
  a shifting channel device including two mutually perpendicular shifting channels which guide shifting movement of the selector lever,
  an automatic selector lever device operable to automatically return the selector lever to a starting position whenever the selector lever is released, and
  transmission operating mode selector means operable to switch the transmission between a first operating mode with automatic selection of individual driving gears, a second operating mode with manual step-by-step shifting between driving gears, and a third operating mode with cruise control, wherein the selector lever is selectively movable in the shifting channels to multiple operating positions for each of the first, second and third transmission operating modes.

34. Selector assembly according to claim 33, wherein a movement of the selector lever, which is directed essentially away from the driver, in the first operating mode, when the vehicle is stopped, causes the engaging of the driving position D of the automatic transmission, and in the case of a forward-driving vehicle, a holding of a constant speed, and in the second operating mode, a sequential upshifting of the automatic transmission, and in the third operating mode, an acceleration during the drive.

35. Selector assembly according to claim 34, wherein a movement of the selector lever directed essentially toward a driver in the first operating mode, when the vehicle is stopped, causes the engagement of the driving position R of the automatic transmission, and in the second operating mode, a sequential backshifting of the automatic transmission, and in the third operating mode, a reduction of the current speed to a stoppage.

36. Selector assembly according to claim 33, wherein a movement of the selector lever directed essentially transversely to a driver toward the latter, in the first operating mode, causes an engagement of the driving position P of the automatic transmission, and, in the third operating mode, causes a canceling of the current adjustments.

37. Selector assembly according to claim 35, wherein a movement of the selector lever directed essentially transversely to a driver toward the latter, in the first operating mode, causes an engagement of the driving position P of the automatic transmission, and, in the third operating mode, causes a canceling of the current adjustments.

38. Selector assembly according to claim 37, wherein a movement of the selector lever directed essentially transversely to a driver away from the latter, in the first operating mode, causes an engaging of the driving position N of the automatic transmission, and, in the second operating mode, causes a canceling of the current adjustments.

39. Selector assembly according to claim 33, wherein, at a driving speed of the motor vehicle below a certain rate, the transmission control device changes automatically from the possibly selected third operating mode into the first operating mode.

* * * * *